(12) United States Patent
Biesenbach et al.

(10) Patent No.: US 9,046,105 B2
(45) Date of Patent: Jun. 2, 2015

(54) ROTOR FOR AN ELECTRIC MOTOR

(71) Applicant: SIEMENS AKTIENGESELLSCHAFT, München (DE)

(72) Inventors: Martin Biesenbach, Düsseldorf (DE); Ralf Bode, Moers (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 0 days.

(21) Appl. No.: 14/288,652

(22) Filed: May 28, 2014

(65) Prior Publication Data

US 2014/0300230 A1    Oct. 9, 2014

Related U.S. Application Data

(63) Continuation of application No. 13/254,245, filed as application No. PCT/EP2010/052730 on Mar. 4, 2010, now Pat. No. 8,847,449.

(30) Foreign Application Priority Data

Mar. 6, 2009    (DE) .......... 10 2009 012 051

(51) Int. Cl.
| F04D 13/06 | (2006.01) |
| H02K 5/128 | (2006.01) |
| H02K 3/44 | (2006.01) |
| H02K 15/00 | (2006.01) |
| H02K 17/16 | (2006.01) |
| H02K 5/12 | (2006.01) |

(52) U.S. Cl.
CPC .......... *F04D 13/0613* (2013.01); *H02K 5/1285* (2013.01); *H02K 5/1282* (2013.01); *H02K 3/44* (2013.01); *H02K 5/128* (2013.01); *H02K 15/0012* (2013.01); *H02K 17/165* (2013.01); *H02K 5/12* (2013.01)

(58) Field of Classification Search
CPC ... H02K 5/128; H02K 5/1285; H02K 5/1282; H02K 2205/12; F04D 13/0613
USPC .................................... 310/86, 261.1; 29/596
See application file for complete search history.

(56) References Cited

U.S. PATENT DOCUMENTS 4,311,932 A *  1/1982  Olson ............................ 310/61
5,304,877 A    4/1994  Baek
(Continued)

FOREIGN PATENT DOCUMENTS

CN    2205604 Y    8/1995
CN    1241835 A    1/2000
(Continued)

*Primary Examiner* — Hanh Nguyen

(57) ABSTRACT

A rotor for an electric motor includes a metal core, a plurality of electrical conductors arranged on the metal core, and a metallic corrosion protection layer enveloping the metal core and the plurality of conductors. The corrosion protection layer is laid as a solid body around the metal core and the conductors and fastened at least to the metal core. The corrosion protection layer is at least a part of a hot-pressing containment for isostatic pressing of the conductors in the metal core.

9 Claims, 2 Drawing Sheets

(56) References Cited

U.S. PATENT DOCUMENTS

| | | | |
|---|---|---|---|
| 6,069,421 A * | 5/2000 | Smith et al. | 310/43 |
| 6,335,581 B1 * | 1/2002 | Warnke | 310/89 |
| 7,098,569 B2 * | 8/2006 | Ong et al. | 310/261.1 |
| 2003/0146670 A1 * | 8/2003 | Van Dine | 310/216 |
| 2006/0158053 A1 * | 7/2006 | Aschoff et al. | 310/91 |
| 2007/0273232 A1 * | 11/2007 | Ong et al. | 310/156.01 |
| 2007/0290569 A1 | 12/2007 | Bode et al. | |

FOREIGN PATENT DOCUMENTS

| | | |
|---|---|---|
| DE | 1089468 B | 9/1960 |
| DE | 29504640 U1 | 5/1995 |
| DE | 19525704 C1 | 7/1996 |
| DE | 69212191 T2 | 4/1997 |
| EP | 0504994 A2 | 9/1992 |
| EP | 1054499 A2 | 11/2000 |
| JP | 2001211615 A | 8/2001 |
| WO | WO 2005124973 A1 | 12/2005 |

* cited by examiner

ROTOR FOR AN ELECTRIC MOTOR

CROSS REFERENCE TO RELATED APPLICATIONS

This application is a continuation of U.S. patent application Ser. No. 13/254,245 filed Nov. 16, 2011. The U.S. patent application Ser. No. 13/254,245 is the US National Stage of International Application No. PCT/EP2010/052730, filed Mar. 4, 2010 and claims the benefit thereof. The International Application claims the benefits of German application No. 10 2009 012 051.3 DE filed Mar. 6, 2009. All of the applications are incorporated by reference herein in their entirety.

FIELD OF INVENTION

The invention relates to a rotor for an electric motor, comprising a metal core, electrical conductors arranged thereon and a metallic corrosion protection layer enveloping the metal core and the conductors, the corrosion protection layer being laid as a solid body around the metal core and the conductors and fastened at least to the metal core.

BACKGROUND OF INVENTION

Industrial electric motors for high rotation speeds, for example for a turbocompressor of an industrial installation, contain a solid rotor which comprises a steel body and an integrated cage made of copper parts, for example rings and rods. The rods are in this case inserted into grooves of the metal core, which extend in the axial direction, and are electrically connected to one another by short-circuit rings likewise made of copper. Such electric motors are also used for the compression of chemically aggressive process gases in industry, which may attack the copper parts so that the working life of these electric motors is reduced.

In order to protect the sensitive motor parts, it is known from WO 2005/124973 A1 to apply a metallic protective layer made of Inconel onto the rotor. Inconel is a registered trademark of Special Metals Cooperation, New Hartford, N.Y., USA. The protective layer covers the copper parts and thus protects them from corrosive gases.

SUMMARY OF INVENTION

It is an object of the present invention to provide an economically producible rotor for an electric motor for the industrial sector, which can be used reliably for the compression of chemically aggressive process gases in industry.

This object is achieved by a rotor of the type mentioned in the introduction, in which according to the invention the corrosion protection layer is laid as a solid body around the metal core and the conductors and is fastened at least to the metal core. Laying the corrosion protection layer as a solid body around the metal core makes it possible to produce the rotor comparatively simply and economically compared with applying corrosion protection metal from the liquid phase.

Advantageously, the corrosion protection layer is fastened not only to the metal core but also to the conductors. The metal core may be formed in one or a plurality of pieces and consist of one or a plurality of metals. The term metal is to be interpreted below as meaning that alloys and metallic mixtures are also to be included. The solid body applied as a corrosion protection layer may be formed in one or a plurality of pieces, for example fitted as a cylindrical tube over the metal core with the conductors or applied as a two-piece housing onto the metal core. The laying may comprise placement or engagement, or more generally all possible application methods.

The corrosion protection layer may be configured in its geometry as a tubular coating over the metal core and the conductors. It delimits the gap between the rotor and the stator of the electric motor. The corrosion protection layer may consist of any desired alloy which can be processed to form a thin-walled tube and is resistant to the chemically aggressive environment to be expected. A high-alloy stainless steel or a nickel-based alloy, for example Inconel 625, is particularly suitable. A nickel-based alloy consists primarily of nickel and comprises at least one further chemical element, which is expediently bonded to the nickel by means of a fusion method.

The fastening of the corrosion protection layer to at least the metal core may be carried out by welding along a seam or by adhesive bonding or by pressure rolling. Combined methods are also advantageous. With welding, additional sealing of the electrical conductors may also be carried out. Purely mechanical methods, such as screwing, may also be envisaged.

In an advantageous embodiment of the invention, the corrosion protection layer is connected to at least the metal core by shrinkage. A mechanically very stable connection to the metal core can be achieved with such cryoforming. The solid body is in this case advantageously expanded, for example by compressed air, before the shrinkage.

A uniform, two-dimensional and very strong connection of the corrosion protection layer to the metal core, and in particular also to the conductors, can be achieved if the corrosion protection layer is connected by hot isostatic pressing to the metal core, and in particular also the conductors. In hot isostatic pressing (HIP), which may also be regarded as a type of diffusion welding, the electrical conductors and the part of the metal core which accommodates them are welded and gastightly sealed, and optionally also evacuated, in a hot-pressing containment, for example a sheet-metal canister, so that the HIP process gas can act on the rotor with the appropriate pressure. Owing to the action of the pressure force from all sides, the pressing takes place isostatically.

Subsequently, in a special apparatus, particularly an autoclave, the rotor is exposed in a protective gas atmosphere to a very high gas pressure acting on all sides. In addition, the rotor is heated very strongly, particularly beyond the yield point of the material of the conductors, and thereby compressed. In this way, a material-fit connection can be achieved between the corrosion protection layer and the conductors, and in particular also the metal core.

In another advantageous embodiment of the invention, between the metal core and the corrosion protection layer there is a metallic interlayer which is diffused from the material by hot isostatic pressing into the metal core and the corrosion protection layer and holds them together. The underlying concept of this variant of the invention is that the yield point of the superficial material of the metal core is usually at such a high temperature that the conductors, which are conventionally made of copper or a copper alloy, experience damage. By using the interlayer, for example a nickel layer or an alloy with nickel as its main component, welding of the corrosion protection layer and the metal core can already be achieved by material diffusion at a temperature of about 1000° C. The material of the metallic interlayer is in this case advantageously such a material as allows diffusion welding of the corrosion protection layer to the metal core up to a temperature of at most 1050° C.

According to another advantageous embodiment of the invention, the corrosion protection layer is at least a part of a hot-pressing containment for isostatic pressing of the conductors in the metal core. This approach takes into account the concept that a mechanically particularly strong connection between the conductors and the metal core can be achieved by hot isostatic pressing. In this case, as described above, the mechanical sheet-metal canister is expedient as a hot-pressing containment in order to be able to shield the rotor's elements to be connected here against incoming gas, so that the gas pressure is maintained from the outside.

By the hot isostatic pressing, a connection can be achieved not only between the conductors and the metal core but also between the hot-pressing containment and the metal core, and expediently also the conductors. The hot-pressing containment may also be used as a corrosion protection layer, if it is made of an appropriate chemically resistant material.

By the enormous pressures during the hot isostatic pressing, the conductors are pressed some way into the grooves of the metal core which contain them, so that it is possible for the metal core to protrude beyond the conductors. This irregular surface shape is transferred to the hot-pressing containment, which then bears against this surface owing to the enormous pressure. In order to keep the gap between the rotor and the stator as small as possible so as to achieve a high efficiency of the electric motor, it is advantageous if the hot-pressing containment is machined flat after the hot isostatic pressing so that an axisymmetric circular surface is obtained.

For gas-tight sealing of the internal space formed by the corrosion protection layer, it is advantageous if the corrosion protection layer is welded to an element of the metal core on one edge.

Isostatic hot pressing sometimes leads to a temperature profile during cooling which is unfavorable in terms of the lattice modifications of the metallic structure of the metal core. For this reason, at least the majority and in particular more than 90% of the metal core is made of a metal, the structure of which obtains its strength by cooling after isostatic pressing. Such metals weld poorly, however, in particular to a nickel-based alloy. The weldability of the material of the corrosion protection layer to the material of the metal core can be improved if, in the direction toward the corrosion protection layer, the element to which the corrosion protection layer is welded comprises a metallic buffer layer to which the corrosion protection layer is welded and which differs in its composition from the underlying substrate of the metal core.

The metallic buffer layer facilitates welding of the corrosion protection layer to the metal core, and may itself be welded to the substrate of the metal core.

Simple production of the corrosion protection layer can be achieved if it is a cylindrical metal tube which is respectively connected, expediently welded, to the metal core at its ends. The corrosion protection layer is in this case advantageously a cylindrical tube without end caps, so that it can be manufactured in one piece and does not have to be assembled from a plurality of parts.

Advantageously, the ends are respectively connected, in particular welded, to a termination ring which holds the conductors axially in position on the metal core. The termination ring may be machined in one piece from the metal core or connected to the metal core, for example by hot isostatic pressing.

The termination ring may be an extension of the metal core extending radially outward, and it expediently slopes radially inward in both axial directions. A short-circuit ring may optionally be arranged between the conductors and the termination ring, in which case it is expediently configured in a plurality of pieces so that it can be laid onto the metal core radially from the outside.

It is furthermore an object of the invention to provide an economical method for producing a corrosion-resistant rotor for an electric motor.

This object is achieved by a method of the type mentioned in the introduction, in which according to the invention a metallic corrosion protection layer is laid as a solid body around the metal core and the conductors and is fastened at least to the metal core. Application of the corrosion protection layer from liquid can be obviated, and a high-strength metal structure of the corrosion protection layer can be achieved in a simple production method.

Advantageously, a hot-pressing containment is laid around the metal core and the conductors and the conductors are isostatically hot-pressed with the metal core, at least a part of the hot-pressing containment subsequently remaining as a corrosion protection layer on the rotor in order to protect the rotor during operation of the electric motor. The hot-pressing containment can therefore fulfill two functions, so that the production process can be kept simple. Expediently, the corrosion protection layer is machined flat following the pressing process, in order to achieve an axisymmetric surface.

It is furthermore advantageous for an interlayer to be applied between the hot-pressing containment and the metal core, so that the pressing temperature at which metal diffusion takes place can be kept low. The interlayer may consist of nickel, which is applied for example as a foil or electrolytically or chemically onto the hot-pressing containment or the metal core. The planarization may be carried out by lathing.

According to another advantageous embodiment of the method according to the invention, the conductors are isostatically hot-pressed with the metal core and the radially outer surface of the rotor is subsequently machined flat, then the corrosion protection layer is applied onto the plane surface and fastened to the plane surface. The fastening is expediently carried out by hot isostatic pressing, in particular by using the interlayer.

BRIEF DESCRIPTION OF THE DRAWINGS

The invention will be explained in more detail below with the aid of exemplary embodiments, which are represented in the drawings, in which.

DETAILED DESCRIPTION OF INVENTION

Figure 1:
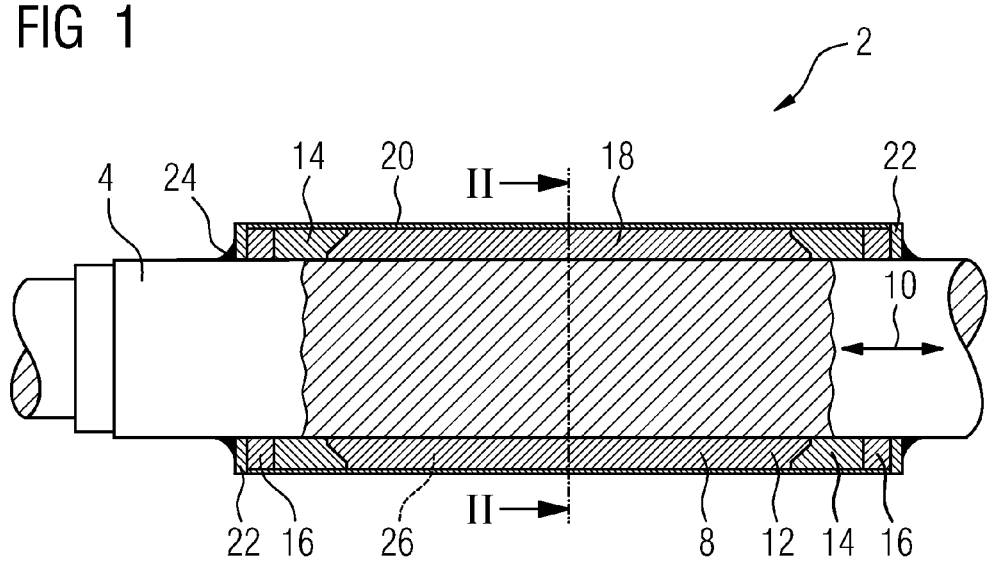
FIG. 1 shows a longitudinal section through a rotor of a 10 MW electric motor for the operation of a turbocompressor.
Figure 2:
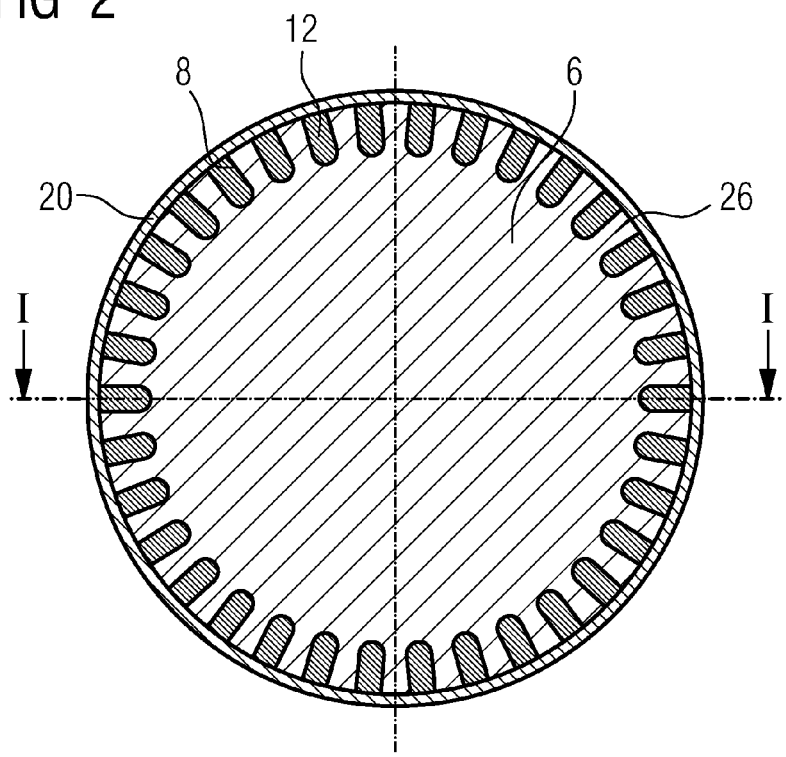
FIG. 2 shows a cross section through the rotor along the line II-II.

FIG. 1 shows a detail of a rotor for a 10 MW electric motor for a turbocompressor for the compression of chemically aggressive process gases in an industrial manufacturing process. The compressor is a radial compressor and is configured for a running speed of at least 14 000 rpm. The rotor comprises a shaft 4, which is represented in a cross section in FIG. 2 and which also forms a metal core 6 of the rotor 2.

A multiplicity of grooves 8, which extend parallel to the axial directions 10 of the rotor 2, are introduced into a central section 18 of the metal core 6, which is configured in one piece and is essentially cylindrical. Electrical conductors 12 in the form of straight copper bars, which are respectively electrically connected to one another at their axial ends by short-circuit rings 14, are respectively laid in the grooves 8. Termination rings 16 hold the short-circuit rings 14 and the axially extending conductors 12 in their axial position on the metal core 6.

A hot-pressing containment 20 in the form of a metallic cylinder, which respectively has an end cap 22 on its two axial ends, is laid around the central section 18 of the metal core 6, the electrical conductors 12 and the short-circuit rings 14 and termination rings 16. The end cap 22 is welded to the shaft 4, or the metal core 6, as indicated by two fillet welds 24. The end cap 22 is furthermore welded to the cylindrical part of the hot-pressing containment 20, although this is not represented in FIG. 1 for the sake of clarity. By these welds, the hot-pressing containment 20 seals the metal core 6 gas-tightly from the surroundings in the region of the conductors 12.

During the process of producing the rotor 2, it is put in an autoclave and hot-isostatically pressed at a high pressure and at temperatures above 1000° C. The conductors 12 are thereby diffusion-welded to one another by means of an interlayer, which is arranged between them and the metal core 6 in the grooves 8, so that the conductors 12 are placed firmly in the metal core 6. The conductors 12 are pressed some way into the grooves 8 by the high pressure, so that between webs 26 of the metal core 6 the grooves 8 form small depressions into which the hot-pressing containment 20 is also pressed in such a way that its cylindrically shaped part is deformed somewhat from rotational symmetry.

Figure 3:
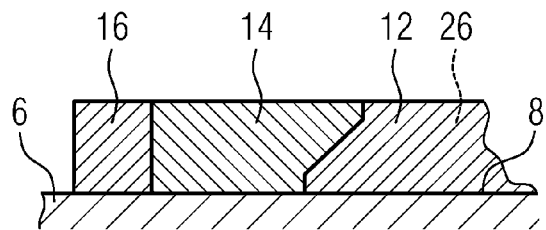
FIG. 3 shows a detail of the rotor of FIG. 1 with the hot-pressing containment removed.

A subsequent method step is explained with the aid of the schematic representation of FIG. 3. The hot-pressing containment 20, including the end caps 22 and the fillet welds 24 is lathed and thereby fully removed, and the metal core 6, the conductors 12, the short-circuit rings 14 and the termination rings 16 are lathed to radial manufacturing dimension and thereby machined flat. The copper of the conductors 12 is thereby radially exposed outward.

Figure 4:
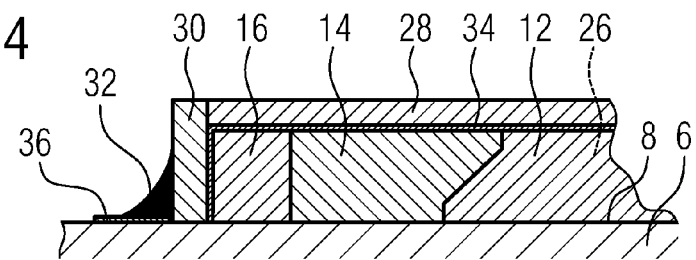
FIG. 4 shows the detail of FIG. 3 with a corrosion protection layer applied.

The next method step is represented with the aid of the diagram in FIG. 4. A new hot-pressing containment 28, with its end caps 30 and fillet welds 32, gas-tightly seals the webs 26, conductors 12, short-circuit rings 14 and steel termination rings 16 externally. Arranged between the hot-pressing containment 28 and the conductors 12 and webs 26, there is furthermore an interlayer 34, for example of nickel, which penetrates both into the hot-pressing containment 28 and into the conductors 12 and webs 26 during subsequent hot isostatic pressing and firmly connects the elements together in the capacity of a diffusion weld. In contrast to the first hot-pressing containment 20, the second hot-pressing containment 28 is made from the metal Inconel 695. As explained above, the term "metal" is also intended to include metal alloys.

A metallic buffer layer 36, which is made of a metal that can be welded with tolerable outlay to the metal core 6, is furthermore welded onto the metal core 6. The two buffer layers 36 are arranged on both sides of the hot-pressing containment 28, so that the two end caps 30 are connected via the two buffer layers 36 and the fillet welds 32 to the metal core by welding. The buffer layers 36 may already be provided when the fillet welds 24 are applied.

Figure 5:
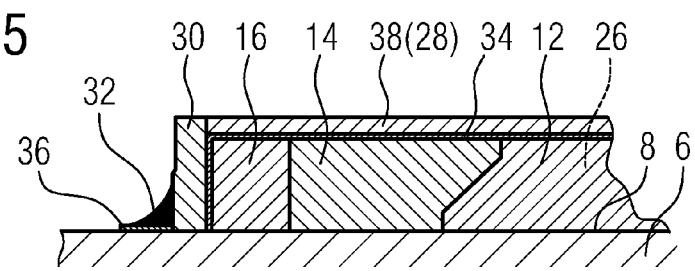
FIG. 5 shows the corrosion protection layer of FIG. 4 in its form ready for operation and FIG. 6 shows a longitudinal section through another rotor of a 15 MW electric motor.

After the subsequent method step of hot isostatic pressing, in which the hot-pressing containment 28 in turn serves as gas-tight shield for building up the application pressure on the metal core 6, as represented in FIG. 5 the hot-pressing containment 28 is lathed to final dimension and thereby machined flat. It now seals the metal core 6 in the region of the conductors 12, the short-circuit rings 14 and the termination rings 16 fully from the external environment, so that the conductors 12 are effectively protected against chemical process gases. The hot-pressing containment 28 now forms a corrosion protection layer 38 around the conductors 12. The welding on the metal core 6 and the diffusion welding on the webs 26 and the conductors 12 provides a mechanically extremely strong structure which withstands even fast rotations of up to 16 000 revolutions/minute and a rotation speed of up to 300 m/second.

Figure 6:
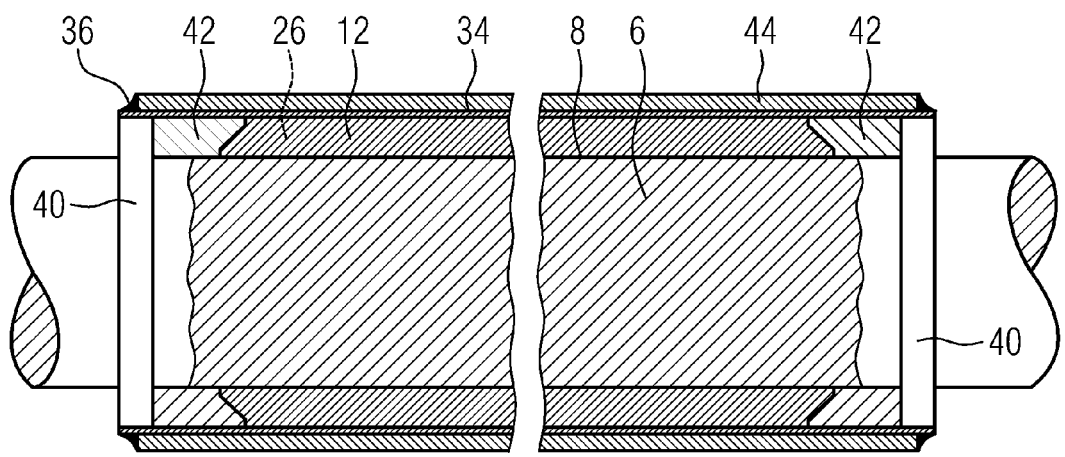

Another exemplary embodiment is represented with the aid of the schematic representation in FIG. 6. The following description is restricted essentially to the differences from the exemplary embodiment in the preceding figures, to which reference is made in relation to the features and functions that remain the same. Components which essentially remain the same are in principle numbered with the same references, and features not mentioned are included in the following exemplary embodiment without being described again.

Termination rings 40 are machined integrally from the metal core 6 as radial extensions, which slope radially inward in both axial directions 10. The axial boundaries are thereby formed for short-circuit rings 42 which are configured in two pieces, i.e. as half-rings, and are laid around the metal core 6. The conductors 12 are inserted between the webs 26, in particular with an interlayer, and a corrosion protection layer 44 which is made of a nickel-based alloy and has a cylindrical shape without end caps is laid around the conductors 12 and the webs 26. At its axial ends, the corrosion protection layer 44 is welded to the termination rings 40, i.e. the metal core 6 itself, buffer layers 36 again being advantageous in this case. An interlayer 34 facilitates the isostatic hot pressing since by virtue of it, as in the preceding exemplary embodiment, diffusion welding can already take place between the corrosion protection layer 44 and the metal core 6 at a temperature which lies below the yield point of the metal of the metal core 6.

In a single hot isostatic pressing method step, the conductors 12 are now firmly connected mechanically to the metal core 6 and the corrosion protection layer 44 is firmly connected to the metal core 6 and the conductors 12. As an alternative, it is possible to carry out the connection in two separate method steps, in which case the conductors 12 are initially connected to the metal core 6 with the aid of a hot-pressing containment 20, the hot-pressing containment 20 is subsequently removed as in the preceding exemplary embodiment, the webs 26 and conductors 12 are machined flat, and as a subsequent step the corrosion protection layer 44 is applied onto the conductors 12 and webs 26 and connected thereto.

The invention claimed is:

1. A rotor for an electric motor, comprising:
   a metal core,
   a plurality of electrical conductors arranged on the metal core, and
   a metallic corrosion protection layer enveloping the metal core and the plurality of conductors, the corrosion protection layer being laid as a solid body around the metal core and the conductors and fastened at least to the metal core,
   wherein the corrosion protection layer is at least a part of a hot-pressing containment for isostatic pressing of the conductors in the metal core, and wherein, between the metal core and the corrosion protection layer, there is a metallic interlayer which is diffused by hot isostatic pressing into the metal core and the corrosion protection layer and holds them together.

2. The rotor as claimed in claim 1, wherein the corrosion protection layer is connected to at least the metal core by shrinkage.

3. The rotor as claimed in claim 1, wherein the corrosion protection layer is connected to at least the metal core by hot isostatic pressing.

4. The rotor as claimed in claim 1, wherein the corrosion protection layer is welded to region of the metal core on one edge.

5. The rotor as claimed in claim 4, wherein the region comprises, in the direction toward the corrosion protection layer, a metallic buffer layer to which the corrosion protection layer is welded and which differs in its composition from the underlying substrate of the metal core.

6. The rotor as claimed in claim 1, wherein the corrosion protection layer is a cylindrical metal tube which is respectively connected to the metal core at its ends.

7. The rotor as claimed in claim 6, wherein the ends are respectively connected to a termination ring which holds the conductors axially in position on the metal core.

8. The rotor as claimed in claim 6, wherein the ends are respectively connected gas-tightly to an extension of the metal core extending radially outward.

9. The rotor as claimed in claim 8, wherein the extension is a termination ring which holds the conductors axially in position on the metal core.

* * * * *